(12) United States Patent
Gifford et al.

(10) Patent No.: US 12,083,780 B2
(45) Date of Patent: Sep. 10, 2024

(54) ASYMMETRIC COMPOSITE MEMBRANES AND HYDROPHILICITIZED MICROPOROUS SHEETS OF POLYOLEFIN USED IN THEIR PREPARATION

(71) Applicant: HYDROXSYS HOLDINGS LIMITED, Auckland (NZ)

(72) Inventors: Dylan Townshend Gifford, Hastings (NZ); Sophie Jayne Mills, Auckland (NZ); Gordon Brett Pascoe, North Hamilton (NZ); Chathuni Duleesha Ranaweera, Auckland (NZ); Walt Wheelwright, Auckland (NZ)

(73) Assignee: HYDROXSYS HOLDINGS LIMITED, Auckland (NZ)

( * ) Notice: Subject to any disclaimer, the term of this patent is extended or adjusted under 35 U.S.C. 154(b) by 966 days.

(21) Appl. No.: 17/060,849

(22) Filed: Oct. 1, 2020

(65) Prior Publication Data
US 2021/0016554 A1 Jan. 21, 2021

Related U.S. Application Data

(63) Continuation-in-part of application No. PCT/IB2020/053116, filed on Apr. 1, 2020, and a
(Continued)

(30) Foreign Application Priority Data

Mar. 30, 2018 (AU) .............................. 2018901072
Apr. 1, 2019 (AU) .............................. 2019901089
Oct. 2, 2019 (AU) .............................. 2019903703

(51) Int. Cl.
*B32B 37/00* (2006.01)
*A23J 1/20* (2006.01)
(Continued)

(52) U.S. Cl.
CPC ............. *B32B 37/0038* (2013.01); *A23J 1/20* (2013.01); *B32B 27/16* (2013.01); *B32B 27/306* (2013.01);
(Continued)

(58) Field of Classification Search
CPC ........ B32B 2038/0052; B32B 2250/24; B32B 2307/728; B32B 27/16; B32B 27/306;
(Continued)

(56) References Cited

U.S. PATENT DOCUMENTS

2013/0116589 A1 5/2013 Ophir et al.
2015/0157986 A1 6/2015 Thom et al.
(Continued)

FOREIGN PATENT DOCUMENTS

CN 103816816 A 5/2014
CN 105498554 A 4/2016
(Continued)

OTHER PUBLICATIONS

International Search report for PCT/IB2019/052649 mailed Jul. 2, 2019.
(Continued)

*Primary Examiner* — Sonya M Sengupta
(74) *Attorney, Agent, or Firm* — Thomas | Horstemeyer, LLP

(57) ABSTRACT

Composite membranes having a film of poly(ethenol) (polyvinyl alcohol; PVA) adhered to a microporous sheet of polyolefin are disclosed. The microporous sheet is made hydrophilic by grafting of the polyolefin, e.g. poly(ethylene), with a preformed polymer before adherence of the film of PVA. The composite membranes are chlorine tolerant with high levels of protein rejection making them particu-
(Continued)

larly suitable for use in the extraction or recovery of water from feed streams in the beverage and food industries, including dairy.

5 Claims, 8 Drawing Sheets

Related U.S. Application Data continuation-in-part of application No. PCT/IB2019/052649, filed on Apr. 1, 2019.

(51) Int. Cl.
  *B32B 27/16* (2006.01)
  *B32B 27/30* (2006.01)
  *B32B 27/32* (2006.01)
  *B32B 38/00* (2006.01)

(52) U.S. Cl.
  CPC .............. *B32B 27/32* (2013.01); *B32B 38/00* (2013.01); *B32B 2250/24* (2013.01); *B32B 2307/728* (2013.01)

(58) Field of Classification Search
  CPC ..... B32B 27/32; B32B 37/0038; B32B 38/00; A23J 1/20; B01D 67/00
  See application file for complete search history.

(56) References Cited

U.S. PATENT DOCUMENTS

| | | | |
|---|---|---|---|
| 2015/0353698 A1 | 12/2015 | Matuschewski et al. | |
| 2017/0197182 A1 | 7/2017 | Holmberg et al. | |
| 2021/0016554 A1* | 1/2021 | Gifford | B01D 67/00 |

FOREIGN PATENT DOCUMENTS

| | | | |
|---|---|---|---|
| JP | 2002201297 A | 12/2004 | |
| JP | 2006053788 | 2/2006 | |
| JP | 201985502 A | 6/2019 | |
| WO | 9313868 | 7/1993 | |
| WO | 01/83602 A1 | 11/2001 | |
| WO | 2004106243 A1 | 12/2004 | |
| WO | 2006035917 A2 | 4/2006 | |
| WO | 2008043507 A1 | 4/2008 | |
| WO | 2010002501 A2 | 1/2010 | |
| WO | 2015073161 A1 | 5/2015 | |
| WO | 2016081729 A1 | 5/2016 | |
| WO | 2016103239 A1 | 6/2016 | |
| WO | 2017056074 A1 | 4/2017 | |
| WO | WO-2019186518 A1 * | 10/2019 | ......... B01D 67/0093 |

OTHER PUBLICATIONS

International Search report for PCT/IB2020/053116 mailed Jul. 15, 2020.
Bolto, B., et al. "Crosslinked poly(vinyl alcohol) membranes", Progressing Polymer Science, 2009, vol. 34, pp. 969-981.
Bae, et al., "Sulfonated polystyrene grafted polypropylene composite electrolyte membranes for direct methanol fuel cells", Journal of Membrane Science, 220, 75-87, Jan. 2003.
Immelman et al., "Poly(vinyl alcohol) gel sub-layers for reverse osmosis membranes. III. Insolubilization by crosslinking with potassium peroxydisulphate", Desalination, 94, 115-132, Dec. 1992.
Koyama et al., "An interpolymer anionic composite reverse osmosis membrane derived from poly(vinyl alcohol) and poly(styrene sulfonic acid)" Journal of Applied Polymer Science, 27, 2783-2789, Jan. 1982.
Mansouri and Fane, "Osmotic distillation of oily feeds", Journal of Membrane Science, 153, 103-120, May 1998.
Nasef and Saidi (2004) Structure of polyethylene-graft-polystyrene sulfonic acid membranes prepared by radiation-induced grafting International Journal of Polymeric Materials, 53, 1027-1043.
Sauk et al., "Preparation of laminated composite membranes by impregnation of polypropylene with styrene in supercritical CO2 for direct methanol fuel cells", Korean J. Chem. Eng., 22(4), 605-610; Feb. 2005.
Shen et al., "Grafted polymer electrolyte membrane for direct methanol fuel cells", Journal of Membrane Science, 251, 121-130, Nov. 2004.
Zinger and Kijel, "Electrically conducting ionomers Polymer", SOREQ Nuclear Research Center, Jan. 1991; 33(3), 467.

* cited by examiner

A

B

ASYMMETRIC COMPOSITE MEMBRANES AND HYDROPHILICITIZED MICROPOROUS SHEETS OF POLYOLEFIN USED IN THEIR PREPARATION

CROSS REFERENCE TO RELATED APPLICATIONS

This application is a continuation-in-part of co-pending International Patent Application entitled "Composite Membranes" having serial no. PCT/IB2020/053116, filed Apr. 1, 2020, which claims priority to Australian Patent Application entitled "Asymmetric Composite Membranes and Modified Substrates Used in Their Preparation" having serial no. 2019901089, filed Apr. 1, 2019, both of which are hereby incorporated by reference in their entireties.

This application is also a continuation-in-part of International Patent Application entitled "Asymmetric Composite Membranes and Modified Substrates Used in Their Preparation" having serial no. PCT/IB2019/052649, filed Apr. 1, 2019, which claims priority to Australian Patent Application entitled "Modified Polymers" having serial no. 2018901072, filed Mar. 30, 2018, both of which are hereby incorporated by reference in its entireties.

This application also claims priority to, and the benefit of, co-pending Australian Provisional Patent Application entitled "Composite Membranes and Modified Substrates Used in Their Preparation" having serial no. 2019903703, filed Oct. 2, 2019 which is hereby incorporated by reference in its entirety.

FIELD OF INVENTION

The invention relates to durable, water permeable, asymmetric composite membranes with high levels of protein rejection and substrates used in their preparation. In particular, the invention relates to durable, water permeable, asymmetric composite membranes consisting of a film of at least partially cross-linked poly(ethenol) adhered to a hydrophilicitized microporous sheet of poly(ethylene).

BACKGROUND ART

Polyolefins, including poly(ethylene), are relatively inert, low surface energy polymers. The preparation of microporous sheets of these polymers is known. Without further treatment the microporous sheets are not readily wetted with water.

It is known to use grafting to modify the surface of substrates formed from polyolefins. For example, the publication of Tazuke and Kimura (1978) discloses photografting onto poly(propylene), poly(ethylene) and several other polymer films using benzophenone as a sensitizer. In this publication the choice of solvent and sensitizer was noted to be very important.

The publication of Ang et al (1980) discloses an irradiation procedure where the sensitizer is dissolved in the monomer solution and can be used for the photosensitized copolymerization in high yields of styrene, 4-vinyl pyridine and methyl methacrylate to poly(propylene). Again, this publication notes that the reaction was found to be very specific to certain types of sensitizers.

The publication of Ogiwara et al (1981) discloses the photografting on poly(propylene) and low-density poly(ethylene) (LDPE) films on which sensitizers were coated beforehand. The sensitizers coated on films enabled vinyl monomers, such as methyl methacrylate, acrylic acid and methacrylic acid to graft easily with high yields. The hydrophilic monomers acrylic acid and methacrylic acid were conveniently grafted using them in aqueous solution in a liquid phase system.

The publication of Allmer et al (1988) discloses the modification of surfaces of LDPE, high-density poly(ethylene) (HDPE) and polystyrene by grafting with acrylic acid. The grafting is performed in the vapor-phase and increased the wettability of the polymer. It was observed that acetone was able to initiate grafting and was found to promote and direct grafting to the surface. The later publication of Allmer et al (1989) discloses the grafting of the surface of LDPE with glycidyl acrylate and glycidyl methacrylate by photoinitiation. Acetone and ethanol were used as solvents, with acetone yielding slightly more grafting at the surface.

The publications of Yao and Ranby (1990a, 1990b and 1990c) disclose inter alia a process for the continuous photoinitiated graft copolymerization of acrylamide and acrylic acid onto the surface of HDPE tape film. The process is performed under a nitrogen atmosphere using benzophenone as the photoinitiator. It was noted that pre-soaking was very important for efficient photographing within short irradiation times. The application of this pre-soaking photografting method to poly(ethylene terephthalate) (PET) was also disclosed. In this context acetone was found to be a somewhat better solvent than methylethylketone and methylpropylketone. When applied to a continuous process for the photochemically induced graft polymerization of acrylamide and acrylic acid of poly(propylene) (PP) fibre surface under a nitrogen atmosphere, optimal concentrations of monomer and initiator in the pre-soaking solution were determined.

The publications of Kubota and Hata (1990a and 1990b) disclose an investigation of the location of methacrylic acid chains introduced into poly(ethylene) film by liquid and vapor-phase photografting and a comparative examination of the photografting behaviours of benzil, benzophenone and benzoin ethyl ether as sensitizers. In these latter studies poly(methacrylic acid) was grafted onto initiator-coated LDPE film.

The publication of Edge et al (1993) discloses the photochemical grafting of 2-hydroxyethyl methacrylate (HEMA) onto LDPE film. A solution phase method is used to produce a material with increased wettability.

The publication of Singleton et al (1993) discloses a method of making a polymeric sheet wettable by aqueous solvents and useful as an electrode separator in an electrochemical device. The polymeric sheet is formed from fibres which comprise poly(propylene) alone and is distinguished from a membrane formed from a microporous polymer sheet.

The publication of Zhang and Ranby (1991) discloses the photochemically induced graft copolymerisation of acrylamide onto the surface of PP film. Acetone was shown to be the best solvent among the three aliphatic ketones tested.

The publications of Yang and Ranby (1996a and 1996b) disclose factors affecting the photografting process, including the role of far UV radiation (200 to 300 nm). In these studies benzophenone was used as the photoinitiator and LDPE film as the substrate. Added water was shown to favour the photografting polymerisation of acrylic acid on the surface of polyolefins, but acetone was shown to have a negative effect due to the different solvation of poly(acrylic acid) (PAA).

The publication of Hirooka and Kawazu (1997) discloses alkaline separators prepared from unsaturated carboxylic acid grafted poly(ethylene)-poly(propylene) fibre sheets.

Again, the sheets used as a substrate in these studies are distinguished from a membrane formed from a microporous polymer sheet.

The publication of Xu and Yang (2000) discloses a study on the mechanism of vapor-phase photografting of acrylic acid onto LDPE.

The publication of Shentu et al (2002) discloses a study of the factors, including the concentration of monomer, affecting photo-grafting on LDPE.

The publication of El Kholdi et al (2004) discloses a continuous process for the graft polymerisation of acrylic acid from monomer solutions in water onto LDPE. The publication of Bai et al (2011) discloses the preparation of a hot melt adhesive of grafted low-density poly(ethylene) (LDPE). The adhesive is prepared by surface UV photografting of acrylic acid onto the LDPE with benzophenone as the photoinitiator.

The publication of Choi et al (2001) states that graft polymerisation is considered as a general method for modifying the chemical and physical properties of polymer materials.

The publication of Choi (2002) discloses a method for producing an acrylic graft polymer on the surface of a polyolefin article comprising the steps of immersing the article in a solution of an initiator in a volatile solvent, allowing the solvent to evaporate, and then immersing the article in a solution of an acrylic monomer before subjecting the article to ultraviolet irradiation in air or an inert atmosphere. Acrylic acid is used as the acrylic monomer in each one of the Examples disclosed in the publication, although the use of equivalent amounts of methacrylic acid, acrylamide and other acrylic monomers is anticipated.

The publication of Choi (2004) discloses the use of "ethylenically unsaturated monomers" in graft polymerisation. These other monomers are disclosed as monomers that are polymerizable by addition polymerisation to a thermoplastic polymer and are hydrophilic as a consequence of containing carboxyl (—COOH), hydroxyl (—OH), sulfonyl ($SO_3$), sulfonic acid (—$SO_3H$) or carbonyl (—CO) groups. No experimental results concerning the chemical and physical properties of graft polymers prepared by a method using these other monomers is disclosed.

The publication of Choi (2005) discloses a non-woven sheet of polyolefin fibres where opposed surfaces of the sheet are hydrophilic as a consequence of an acrylic graft polymerisation. The properties of the sheet are asymmetric, the ion exchange coefficient of the two surfaces being different. The method used to prepare these asymmetric acrylic graft polymerised non-woven polyolefin sheets comprises the steps of immersing the substrates in a solution of benzophenone (a photoinitiator), drying and then immersing the substrate in a solution of acrylic acid prior to subjecting to ultraviolet (UV) irradiation. The irradiation may be performed when the surfaces are in contact with either air or an inert atmosphere.

The publication of Callis et al (2008) discloses humidifier membranes for use in fuel cells. The membranes are a microporous web of polyolefin fibrils having a hydrophilic surface. The membranes allow for the passive transfer of water between separated gasses of differing humidity. The membranes are manufactured by grafting a hydrophilic monomer to the surface of the microporous web of polyolefin fibrils. A reduction of the pore size as a consequence of the grafting process is sought. Sodium-styrene sulfonic acid (SSS; 4-ethenyl benzene sulfonic acid) is identified as one of the hydrophilic monomers that may be used in the manufacture of the membranes.

The publication of Gao et al (2013) discloses a method of preparing a radiation cross-linked lithium-ion battery separator. In an example, a porous polyethylene membrane is immersed in a solution of benzophenone and triallyl cyanurate in dichloromethane. The immersed membrane is dried at room temperature before being immersed in a water bath at 30° C. and irradiated on both sides using a high-pressure mercury lamp for three minutes.

The publication of Jaber and Gjoka (2016) discloses the grafting of ultra-high molecular weight polyethylene microporous membranes using monomers having one or more anionic, cationic or neutral groups. The publication states that the authors have discovered that molecules can be grafted on the surface of an asymmetric, porous ultra-high molecular weight polyethylene membrane using an ultraviolet radiation energy source. The grafted membranes are proposed for use in removing charged contaminants from liquids.

The objective of the majority of the foregoing prior art methods is to improve the adhesion, biocompatibility, printability or wettability of the surface of a substrate using photoinitiated polymerisation. These methods are to be distinguished from the use of UV-initiated grafting with an exogenously prepared preformed polymer to modify the permeability to water of an inherently hydrophobic microporous polyolefin substrate.

The publication of Schmolka (1973) discloses the preparation of polyoxyethylene-polyoxypropylene block polymers represented by the formula:

$$HO(C_2H_4O)_b(C_3H_6O)_a(C_2H_4O)_bH$$

where a is an integer such that the hydrophobic base represented by ($C_3H_6O$) has a molecular weight of at least 2,250 and b is an integer from about 8 to 180 or higher. These block polymers are used to prepare solid or semisolid colloids containing considerable quantities of liquid—'gels' or 'hydrosols' (where the liquid is water) that are particularly useful in the formulation of topically applicable cosmetic and pharmaceutical compositions. Referred to as poloxamers, these nonionic triblock copolymers are supplied under a number of trade names, including ACCLAIM™, ADEKANOL™, ANTAROX™, BASOROL™, BLAUNON™, ETHOX™, KOLLIPHOR™, LUTROL™, MEROXAPOL™, PLURIOL™, PLURONIC™ and SYNPERONIC™. The properties of the poloxamer are determined by both the ratio and size of the integers a and b. Triblock copolymers in which the order of the polyoxyethylene and polyoxypropylene blocks is reversed are also supplied under these trade names. These "reverse" triblock copolymers may be identified by the use of the letter "R" and should not be referred to as "poloxamers".

The publication of Wang et al (2006) discloses the formation of membranes from blends of polyether sulfone and different triblock copolymers by a phase inversion method. Water fluxes determined for the membranes were observed to be dependent on the triblock copolymer structure rather than content. For example, the water flux (50.161 LMH) of a membrane formed from a blend with PLURONIC™ 123 was observed to be less than that (109.081 LMH) observed for the polyether sulfone control membrane. The water flux (218.28 LMH) of a membrane formed from a blend with PLURONIC™ F68 was observed to be higher than that of the control membrane.

The publication (machine translation) of Liu et al (2014) discloses the preparation of a microporous membrane with a microstructured surface for use in the separation of oil from water in oil/water emulsions. In the method of preparing the membrane polyoxyethylene-polyoxypropylene-polyoxyethylene (F127) is used as an additive in the preparation of a homogenous solution of polymer in solvent. The polymer is selected from a group consisting of polyvinylidene fluoride (PVDF), polysulfone (PSf), polyether sulfone (PES), polyacrylonitrile (PAN), polyvinyl chloride (PVC), polylactic acid (PLA), polyimide (PI), polypropylene (PP) or cellulose acetate and the solvent is selected from a group consisting of chloroform ($CHCl_3$), N,N-dimethyl formamide (DMF), N,N-dimethyl acetamide (DMAc), phosphoric acid triethyl ester (TEP), trimethyl phosphate (TMP), N-methyl pyrrolidone (NMP), dimethyl solfoxide (DMSO), tetrahydrofuran (THF), dibutyl phthalate (DBP), dioxane, propiophenone, diphenyl ether in one or more mixtures thereof.

The publication of Yang et al (2014) discloses a composite polymer electrolyte for use in lithium-polymer batteries. The composite was composed of mesoporous modified silica fillers dispersed in poly(vinylidene fluoride-hexafluoropropylene) matrix. The triblock copolymer PLURONIC™ 123 (Aldrich) was used in the preparation of the mesoporous silica fillers.

The publication of Guo et al (2015) discloses a microporous material used in micro- and ultrafiltration membranes. The microporous material comprises finely divided particles, such as water insoluble silica filler, distributed throughout a matrix, such as poly(ethylene). The material further comprises a network of interconnecting pores and may be further processed depending on the desired application. In such further processing triblock copolymers based on poly(ethylene oxide)-poly(propylene oxide)-poly(ethylene oxide) may be used as a hydrophilic coating, although polymers comprising tertiary amine functional groups are preferred. Without intending to be bound by theory, it is stated that components of the coating may interact with the silica particles in the fill of the microporous material and adjust the surface energy, affecting wettability. No covalent binding of the hydrophilic coating, such as that achievable by grafting, is disclosed.

The publication (machine translation) of Cheng et al (2017) discloses the use of poly(ethylene oxide)-poly(propylene oxide)-poly(ethylene oxide) triblock copolymer as a "structure directing agent" in the preparation of a mesoporous composite film. The structure directing agent is used with a catalyst and precursor compound such as tetraethyl orthosilicate, titanium tetrachloride, titanium n-butyl acetate, isopropyl titanium, phtalic acid di-zinc acetate, tin ester and one or more of niobate to provide the mesoporous composite film.

The publication of Carter et al (2018) discloses the evaluation of the triblock copolymer PLURONIC™ L64 as a solvent for pore filling regenerated cellulose membranes during initiator immobilisation. Glycerol was determined to be a more efficient pore filling solvent in this context.

The publication of Bolto et al (2009) reviews what is disclosed in publications concerning the cross-linking of poly(ethenol), i.e. PVA. These publications include those concerning cross-linking methods and the grafting of PVA onto support membranes, including porous hydrophobic membranes such as poly(ethylene) and poly(propylene).

The publication of Linder et al (1988) discloses semipermeable composite membranes comprising a film of modified PVA or PVA-copolymers on a porous support. Suitable support materials are required to be water insoluble and may be chosen, e.g. from polyacrylonitriles, polysulfones, polyamides, polyolefins such as poly(ethylenes) and poly(propylenes), or cellulosics.

The publication of Exley (2016) discloses an asymmetric composite membrane consisting of a film of cross-linked poly(ether ether ketone) adhered to a sheet of grafted microporous poly(ethylene). The microporous poly(ethylene) is obtained by photoinitiated grafting with an ethenyl monomer to provide a hydrophilicitized sheet.

The publication of Craft et al (2017) discloses improvements in the asymmetric composite membranes disclosed in the publication of Exley (2016). The improved asymmetric composite membranes comprise of poly(vinyl alcohol) polymer crosslinked with a crosslinking agent (such as divinyl benzene) coated on a film of cross-linked poly(ether ether ketone) adhered to a sheet of the grafted microporous poly(ethylene). The improvement is in the selectivity of the asymmetric composite membrane obtained.

The fouling by non-specific adsorption or deposition of proteins necessitates periodic cleaning of filtration membranes. Efficiencies in plant operation are realised if the filtration membrane assemblies can be cleaned in situ. Filtration membranes that are tolerant to the agents (acid, alkali, hypochlorite) used in these clean-in-place protocols are desired.

It is an object of the present invention to provide asymmetric composite membranes with improved levels of protein rejection while maintaining an acceptable flux. It is an object of the present invention to provide a method for preparing the asymmetric composite membranes. It is an object of the present invention to provide a hydrophilicitized sheet of microporous polyolefin particularly suited for use in the method of preparing the asymmetric composite membrane. It is an object of the present invention to provide asymmetric composite membranes and hydrophilicitized sheets of microporous polyolefin adaptable for use in extracting or recovering water from feed streams in a variety of industries where durability of the membranes or sheets is advantageous, including beverage and food processing industries such as the dairy industry. These objects are to be read in the alternative with the object at least to provide a useful choice in the selection of such methods, membranes and sheets.

STATEMENT OF INVENTION

In a first aspect a composite membrane comprising poly(ethenol) adhered to a hydrophilicitized microporous sheet of polyolefin is provided.

A hydrophilicitized microporous sheet is one that "wets out" on contact with water under ambient conditions, i.e. without the need to apply heat or pressure. This wetting out is often observed as a change in the appearance of the microporous sheet from opaque to uniformly translucent. Desirably, the hydrophilicitized microporous sheet of polyolefin has a surface tension of at least 70 dyne/cm. The hydrophilicitized microporous sheet is composed of polyolefin grafted with a preformed polymer. The polymer may be selected from the group consisting of: poly(4-ethenyl benzene sulfonic acid) and poloxamers.

The membrane is typically an asymmetric composite membrane with the poly(ethenol) adhered predominantly to one side of the sheet. The adherence to the hydrophilicitized microporous sheet may be by the radical initiated formation of covalent bonds between the poly(ethenol) and the polyolefin, i.e. grafting. Often, the poly(ethenol) will be at least partially crosslinked in addition to being adhered to the microporous sheet.

The polyolefin can be a poly(ethylene), poly(propylene), poly(butylene) or poly(methylpentene). In certain embodiments the polyolefin is poly(ethylene) or poly(propylene).

In a first embodiment of the composite membrane the hydrophilicitized microporous sheet is composed of poly(ethylene) or poly(propylene) grafted with a preformed poly(4-ethenyl benzene sulfonic acid).

In a second embodiment of the composite membrane the hydrophilicitized microporous sheet is composed of poly(ethylene) or poly(propylene) grafted with a poloxamer of the structure:

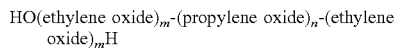

where m is in the range 15 to 25 and n is in the range 50 to 90. Ideally, the poloxamer is equivalent to the polymer supplied under the trade name PLURONIC™ P-123 (Sigma-Aldrich).

In both embodiments, the polyolefin used in the preparation of the composite membrane will most often be poly(ethylene). Embodiments of the composite membrane that are asymmetric consist essentially of a film of at least partially crosslinked poly(ethenol) adhered to a microporous sheet of poly(ethylene) where the poly(ethylene) has been grafted with a preformed poly(4-ethenyl benzene sulfonic acid) or a poloxamer before adherence of the film of at least partially crosslinked poly(ethenol).

In a second aspect a method of preparing a composite membrane is provided. The method may be adapted for the continuous or semi-continuous production of the composite membrane. The method comprises:
1) Wetting a microporous sheet of grafted polyolefin with a solution in an aqueous solvent comprising poly(ethenol) and an initiator;
2) Treating the wetted, microporous sheet to adhere the poly(ethenol) to the sheet; and then
3) Drying and washing the sheet to provide the composite membrane.

The aqueous solvent is typically water. The initiator can be a persulfate. Examples of suitable initiators are ammonium (APS) and sodium persulfate (SPS). The treating the wetted, microporous sheet can be by heating or irradiating with ultraviolet light (UV) or a combination of both. Often the treating will be by irradiating with ultraviolet light (UV) at a wavelength of 250 nm.

The poly(ethenol) may be crosslinked to a degree equivalent to that of the partially crosslinked poly(ethenol) provided in Vial 2 of Example 9 to that of the partially crosslinked poly(ethenol) provided in Vial 4 of Example 9. Desirably, the poly(ethenol) is crosslinked to a degree substantially equivalent to that of the partially crosslinked poly(ethenol) provided in Vial 3 of Example 9. The poly(ethenol) may be crosslinked before or after wetting the microporous sheet.

In a first embodiment of the method the polyolefin has been grafted with a preformed poly(4-ethenyl benzene sulfonic acid). The preformed poly(4-ethenyl benzene sulfonic acid) may be equivalent to that provided in the working solution prepared according to Example 1.

In a second embodiment of the method the polyolefin has been grafted with a poloxamer of the structure:

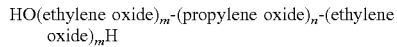

where m is in the range 15 to 25 and n is in the range 50 to 90. Ideally, the poloxamer is equivalent to the polymer supplied under the trade name PLURONIC™ P-123 (Sigma-Aldrich).

Typically, one side of the sheet will be wetted with the aqueous solution and an asymmetric composite membrane will be prepared. When the polyolefin is grafted with poly(4-ethenyl benzene sulfonic acid), the poly(ethenol) is preferably crosslinked before wetting the microporous sheet. When the polyolefin is grafted with a poloxamer, the poly(ethenol) is preferably crosslinked after wetting the microporous sheet.

The polyolefin used in the preparation of the composite membrane can be a poly(ethylene), poly(propylene), poly(butylene) or poly(methylpentene). In certain embodiments the polyolefin is poly(ethylene) or poly(propylene). Often the polyolefin will be poly(ethylene).

The drying of the contacted sheet may be by applying a thermal gradient across the thickness of the sheet from the contacted one side of the hydrophilicitized microporous sheet to the other side. Applying heat may be used to control the degree of hydrophilicity of the microporous sheet when the polyolefin is grafted with a poloxamer.

An asymmetric composite membrane capable of providing at least 99.9% total protein rejection at a flux of 5 LMH with milk as a feed stream can be provided.

In the description and claims of this specification the following abbreviations, acronyms, terms and phrases have the meaning provided: "block" means portion of a macromolecule comprising many constitutional units, that has at least one constitutional or configurational feature which is not present in the adjacent portions; "CAS RN" means Chemical Abstracts Service (CAS, Columbus, Ohio) Registry Number; "comprising" means "including", "containing" or "characterized by" and does not exclude any additional element, ingredient or step; "comprising" means "including", "containing" or "characterized by" and does not exclude any additional element, ingredient or step; "consisting essentially of" means excluding any element, ingredient or step that is a material limitation; "consisting of" means excluding any element, ingredient or step not specified except for impurities and other incidentals; "crosslinking agent" means a material that is incorporated into the crosslinking bridge of a cross-linked polymer network; "cross-linking" means a reaction involving sites or groups on existing macromolecules or an interaction between existing macromolecules that results in the formation of a small region in a macromolecule from which at least four chains emanate; "curing" means chemical process of converting a prepolymer or a polymer into a polymer of higher molecular mass and connectivity and finally into a network; "flux" means the rate (volume per unit of time) of permeate transported per unit of membrane area; "graft molecule" or "graft polymer molecule" means a macromolecule with one or more species of block connected to the main chain as side chains having constitutional or configurational features that differ from those in the main chains; "graft polymer" means a polymer in which the linear main chain has attached to it at various points side chains of a structure different from the main chain; "grafting" means a reaction in which one or more species of block are connected to the main chain of a macromolecule by side chains having constitutional configurational features that differ from those in the main chain and "grafted" has a corresponding meaning; "homopolymer" means a polymer formed by the polymerization of a single monomer; "hydrophilic" means having a tendency to mix with, dissolve in, or be wetted by water and "hydrophilicity", "hydrophilicitized" and "hydrophilicitizing" have a corresponding meaning; "initiator" means a labile compound which forms a radical; "LMH" means litres per hour per square metre; "macromolecule" or "polymer molecule"

means a molecule of high relative molecular mass, the structure of which essentially comprises the multiple repetition of units derived, actually or conceptually, from molecules of low relative molecular mass; "macromonomer molecule" means a macromolecule that has one end-group which enables it to act as a monomer molecule, contributing only a single monomeric unit to a chain of the final macromolecule; "microporous" means having a median pore diameter less than 20 nm; "monomer molecule" means a molecule which can undergo polymerisation, thereby contributing constitutional units to the essential structure of a macromolecule; "monomeric unit", "monomer unit" or "mer" means the largest constitutional unit contributed by a single monomer molecule to the structure of a macromolecule; "partially crosslinked" means that only a portion of the available sites for cross-linking are utilised and the cross-linking reaction has been limited by reagents, temperature or period of time; "permeable" means allowing the passage of a solvent, e.g. water; "photoinitiator" means a photolabile compound which upon irradiation forms a radical; "poloxamer" means a non-ionic triblock copolymer composed of a central chain of poly(propylene oxide) flanked by two chains of poly(ethylene oxide); "poly(ethenol)" and "polyvinyl alcohol" are used synonymously; "post-treated polymer" means a polymer that is modified, either partially or completely, after the basic polymer backbone has been formed; "preformed" means formed beforehand, i.e. prior to treatment or use; "PSSS" or "pSSS" denotes the product of the polymerization of SSS, i.e. poly(4-ethenylbenzenesulfonic acid); "PVA" denotes poly (ethenol) (or polyvinyl alcohol); "semipermeable" means allowing certain substances to pass through, but not others, especially allowing the passage of a solvent, e.g. water, but not of certain solutes, e.g. proteins, salts or sugars; "SSS" denotes sodium styrene sulfonate, i.e. the sodium salt of 4-ethenylbenzenesulfonic acid; "UVA" means electromagnetic radiation having wavelengths between 320 and 400 nm; "UVB" means electromagnetic radiation having wavelengths between 290 and 320 nm; "UVC" means electromagnetic radiation having wavelengths between 200 and 290 nm; "wettable" means becoming permeated with solvent, e.g. water, on being contacted with the solvent under standard laboratory conditions (i.e. 25° C. at 100 kPa); and "xPVA" denotes PVA that is at least partially crosslinked.

A paronym of any of the defined terms has a corresponding meaning. Where there is uncertainty in respect of the meaning of an undefined abbreviation, acronym, phrase or term relating to polymer terminology and nomenclature the meaning provided in the publication of Jones et al (2008) is to take precedent.

The terms "first", "second", "third", etc. used with reference to elements, features or integers of the subject matter defined in the Statement of Invention and Claims, or when used with reference to alternative embodiments of the invention are not intended to imply an order of preference. The numbering of the Examples and the Comparative Examples (if any) is not intended to mean any pair of Example and Comparative Example is directly comparable. Where values are expressed to one or more decimal places standard rounding applies. For example, 1.7 encompasses the range 1.650 recurring to 1.749 recurring. Where concentrations or ratios of reagents or solvents are specified, the concentration or ratio specified is the initial concentration or ratio of the reagents or solvents. References to the use of 4-ethenylbenzenesulfonic acid encompass references to the use of salts of the acid, including SSS. In the absence of further limitation, the use of plain bonds in the representations (if used) of the structures of compounds encompasses the diastereoisomers, enantiomers and mixtures thereof of the compounds.

It is understood that the microporous sheets supplied as TARGRAY™ wet process polyethylene separators have a median pore diameter less than 20 nm. It is understood that m is 20 and n is 70 for the polymer supplied under the trade name PLURONIC™ P-123 (Sigma-Aldrich).

The invention will now be described with reference to embodiments or examples and the figures of the accompanying drawings pages.

DETAILED DESCRIPTION

Figure 1:
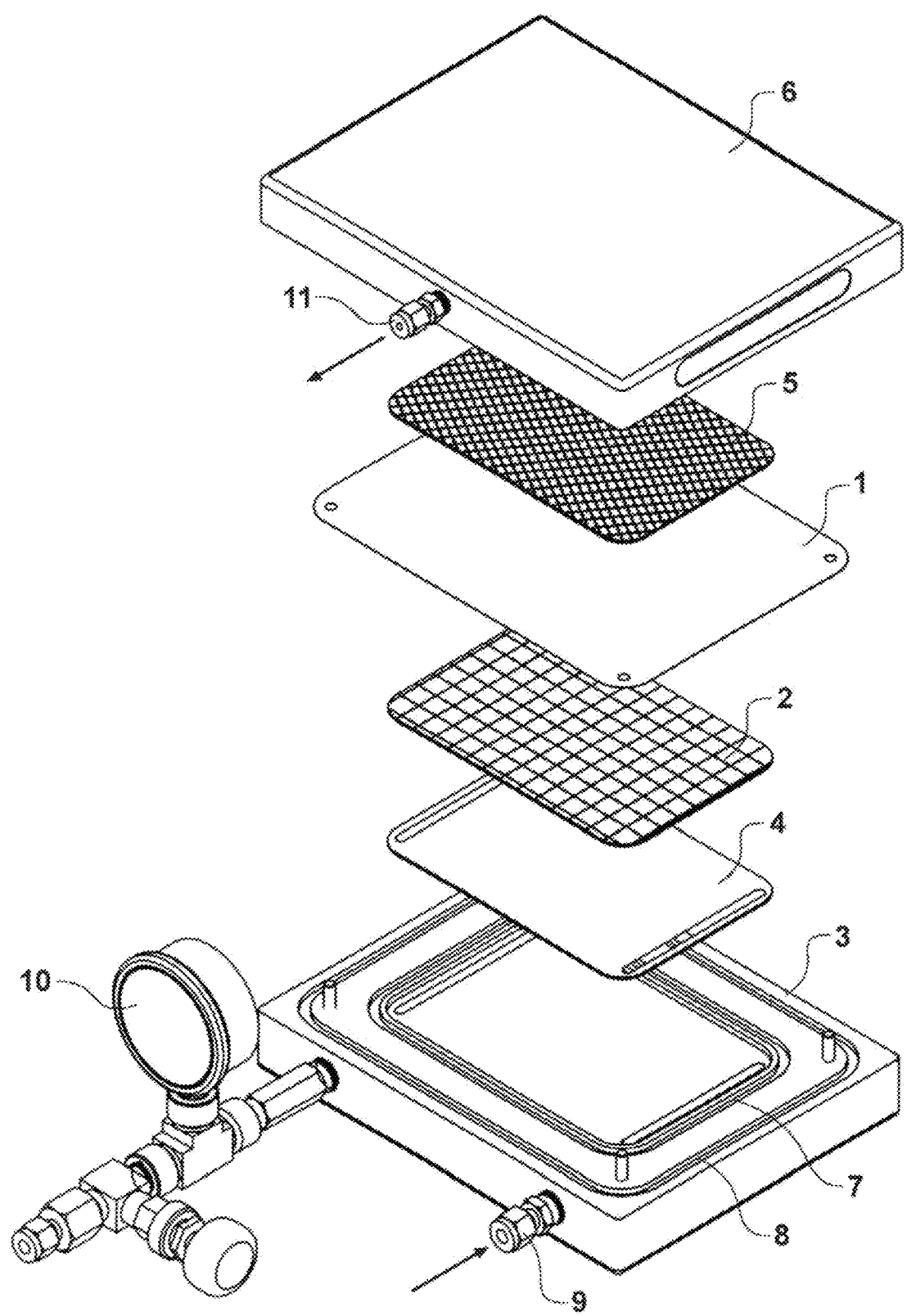
FIG. 1. Exploded view of the filter assembly (Sterlitech Corp.) used in the flux testing of samples of composite membranes and hydrophilicitized microporous sheets.

Polyolefins are inherently hydrophobic, whereas poly (ethenol) (polyvinyl alcohol; PVA) is inherently hydrophilic and water soluble. The incompatible properties of the two polymers present an obstacle to the preparation of composite membranes consisting of poly(ethenol) adhered, e.g. by photoinitiated grafting, to a polyolefin substrate, such as a microporous sheet. The obstacle may be overcome by modification of the surface of the substrate to increase its hydrophilicity, i.e. wettability. It has been found that wettable, microporous sheets of polyolefin suitable for use in the manufacture of composite membranes comprising poly(ethenol) can be prepared by grafting the polyolefin substrate with certain preformed polymers. The use of the preformed polymers demonstrated here allows for the preparation of microporous sheets of polyolefin with differing degrees of hydrophilicity. Along with the selection of solvent, the degree of hydrophilicity can be used to control the extent to which the solution of poly(ethenol) permeates the microporous sheet of polyolefin during the preparation of the composite membranes. Such control can be advantageous for the continuous production of composite membranes. The use of microporous sheets of polyolefin grafted with a poloxamer is particularly advantageous as the degree of hydrophilicity imparted by these thermoresponsive polymers can additionally be controlled by temperature.

Providing a hydrophilicitized, i.e. wettable, microporous sheet of polyolefin facilitates the formation of a film of at least partially crosslinked poly(ethenol) (xPVA) on the surface and adherence to that surface. In contrast with the preparation of the asymmetric composite membranes disclosed in the publication of Craft et al (2017) persulfate is used as an agent to promote cross-linking. The high levels of protein rejection demonstrated for these composite membranes is attributed in part to the selection of this crosslinking agent. A porosity providing a size exclusion reduced to an estimated 30 kDa from an estimated 160 kDa is believed to be achieved (and is supported by the increased levels of total protein rejection of greater than 99.9%).

When drying the hydrophilicitized microporous sheet of polyolefin following contact with the dispersion in aqueous solvent of poly(ethenol) (PVA) applying a thermal gradient across the thickness of the sheet from the contacted side to the other side is also believed to assist in maintaining the porosity of the sheet and thereby provide a composite membrane with higher flux rates than might otherwise be achievable. In Example 10 the application of a positive thermal gradient is a consequence of the sheet being supported on a glass plate during the drying steps. The positive thermal gradient is believed to limit the extent to which the dispersion in water may permeate the pores of the hydrophilicitized microporous sheet.

When the hydrophilicitized microporous sheet of polyolefin has been prepared using a poloxamer, as in Example 12, heating transiently alters the degree of hydrophilicity imparted by the graft. This phenomenon may also be utilised to promote formation of a thin film of poly(ethenol) at the surface of the sheet without loss of porosity of the substrate. The transient decrease in hydrophilicity favours exclusion of the aqueous solvent from the pores of the substrate.

The composite membranes provided here are distinguished from other membranes, e.g. those suggested in the publication of Linder et al (1988), where a superficial film of cross-linked PVA or PVA-copolymer is proposed to be coated on a hydrophobic, i.e. water repelling, microporous sheet of polyolefin.

Materials and Methods

All microporous sheets of polyolefin used in the preparation of samples were prepared from virgin poly(ethylene), i.e. poly(ethylene) of high purity.

FTIR

Spectra of the samples were recorded using a Thermo Electron Nicolet 8700 FTIR spectrometer equipped with a single bounce ATR and diamond crystal. An average of 32 scans with a 4 cm$^{-1}$ resolution was taken for all samples.

Flux

Permeability was determined using a filter assembly (Sterlitech Corp.) (FIG. 1) by measuring the flux with deionized water as the feed stream at various pressures. Flux $J_V$ was then graphed against effective pressure difference across the membrane, $p_{eff}$, and the slope of the permeability $L_p$.

$$L_p = \frac{J_V}{\Delta p_{eff}}$$

The samples were mounted in the filter assembly. Deionized water was fed into the rig at 2.5 L min$^{-1}$ and 4 to 8° C. The time to collect a predetermined volume of permeate was noted. The flux rate (J) was calculated according to the following equation:

$$J = \frac{V}{t \times A}$$

where V is the permeate volume (L), t is the time (h) for the collection of V and A is area of the sample (m$^2$) which was determined to be 0.014 m$^2$.

Salt Rejection

Rejection was measured using a 2 g/L solution in water of sodium chloride with a feed pressure of 16 bar. The conductivities from the feed and permeate were compared.

$$\%R_{NaCl} = \left(1 - \frac{\sigma_p}{\sigma_f}\right) \times 100$$

where $\sigma_p$ is the conductivity of permeate and $\sigma_f$ is the conductivity of the feed.

Total Solids Rejection

Rejection for whole milk samples was measured by pouring 20 mL of sample from the feed in a petri dish and measuring the dry weight after 2 hours in a 100° C. oven.

$$\%R_{TS} = \left(1 - \frac{m_{p,TS}}{m_{f,TS}}\right) \times 100$$

where $m_{p,TS}$ is total milk solids in the permeate and $m_{f,TS}$ is the mass of milk total solids in the feed.

Protein Concentrations

Total protein and total whey protein concentrations in permeate were calculated on the basis of HPLC analysis with UV absorbance monitoring.

'Clean-in-Place' (CIP) Protocol

To mimic commercial processing operations samples of the composite membrane was subjected to repeated in situ washing protocols) as described in Craft et al (2017). The intermediate and subsequent flux rates were determined to assess the likely durability of the membrane in commercial processing operations. The in situ washing protocol was based on that employed in a commercial processing operation but modified in duration to compensate for the greater exposure of the membrane to the cleaning agents (caustic and acid) in the filter assembly. Prior to the washing steps the membrane was rinsed by circulating water at an initial temperature of 65° C. through the filter assembly for a period of time of three minutes before draining the system.

The membrane was subjected to a first wash by circulating a 2% (w/v) sodium hydroxide solution ("caustic wash") through the filter assembly for a period of time of five minutes before draining and flushing the system by circulating water at an initial temperature of 65° C. through the filter assembly system for a period of time of five minutes. The membrane was subjected to a second wash by circulating a 2% (w/w) nitric acid solution ("acid wash") through the filter assembly system for a period of time of ten minutes before draining and flushing the system of circulating water at an initial temperature of 65° C. for a period of time of ten minutes. The membrane was subjected to a third wash (a "caustic wash") before flushing the system by circulating water at an initial temperature of 65° C. for a period of time of five minutes before circulating chilled water for a period of time of five minutes to cool the system. All rinsing and washing steps were performed with no pressure recorded on the pressure gauge of the filter assembly.

Hydrophilicitized Macroporous Sheets of Polyolefin

Preparation of poly(4-ethenylbenzenesulfonic acid)

Example 1

A quantity of 50 g of the monomer 4-ethenylbenzenesulfonic acid as its sodium salt (SSS) was dissolved in a volume of 100 mL of distilled water to provide a solution. A quantity of 0.5 g of the initiator sodium persulfate (SPS) was then dissolved in the solution and the initiator-monomer mixture heated with stirring at a temperature of 80 to 90° C. for a time of about 20 minutes. A viscous solution was obtained having a total volume of about 125 mL. The viscous solution was diluted with the same volume of distilled water to provide 250 mL of a working solution of poly(4-ethenylbenzenesulfonic acid).

The polymer could be precipitated from this working solution by the addition of an excess volume of acetone, followed by collection of the precipitate by filtration through a Buchner funnel and then washing with acetone to provide a light white solid that could be readily ground to a powder using a pestle and mortar.

Example 2

A quantity of 5 g of the monomer 4-ethenylbenzenesulfonic acid as its sodium salt (SSS) was dissolved in a volume of 20 mL of dimethylsulfoxide (DMSO) to provide a solution.

A quantity of 0.05 g of the initiator ammonium persulfate (APS) was then dissolved in the solution and the initiator-monomer mixture heated with stirring at a temperature of 80 to 90° C. for a time of about 20 minutes. The poly(4-ethenylbenzenesulfonic acid) was precipitated from the cooled solution by addition of an excess volume of acetone, collected by filtration through a Buchner funnel and washed with acetone to provide the same light white solid that could be readily ground to a powder obtainable in Example 1.

Figure 2:
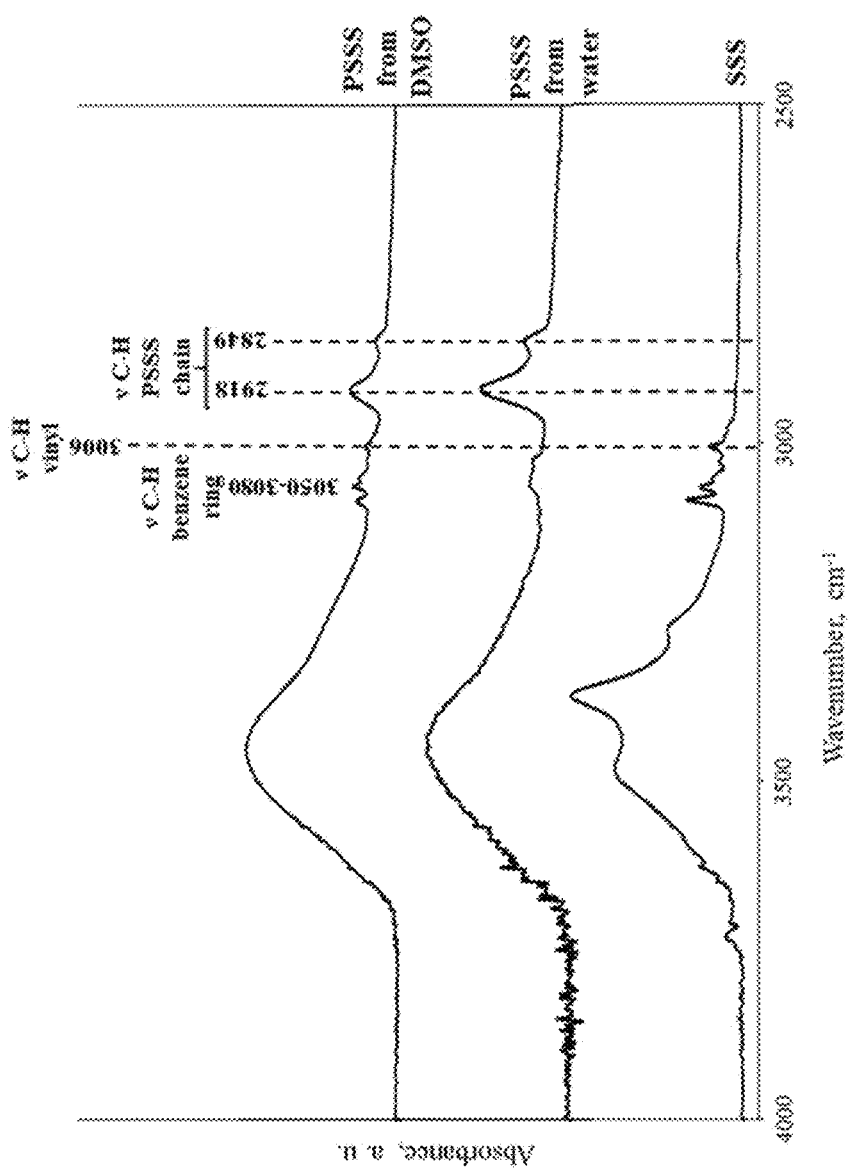
FIG. 2. FTIR spectra of the monomer 4-ethenylbenzenesulfonic acid (SSS) and poly(4-ethenylbenzenesulfonic acid) (PSSS) prepared according to the method described in Example 1 (water) and Example 2 (DMSO).

The Fourier transform infrared (FTIR) spectra of the powder obtained by the methods of preparation described in Example 1 (pSSS from water) and Example 2 (pSSS from DMSO) are compared with that of the FTIR spectrum of the monomer 4-ethenylbenzenesulfonic acid (SSS) in FIG. 2. A comparison of the spectra was consistent with the polymerisation of the monomer in both methods of preparation. The polymer prepared by the method described in Example 1, i.e. the working solution, was used as the hydrophilicitizing agent in the preparation of hydrophilicitized sheets of microporous poly(ethylene) according to the following examples.

Preparation of Hydrophilicitized Microporous Sheets of poly(ethylene) Using poly(4-ethenylbenzenesulfonic acid)

Example 3

A volume of 6 mL of the working solution obtained according to Example 1 was mixed with a volume of 5 mL of distilled water in a vial to provide a volume of initial solution containing 1.2 g of poly(4-ethenylbenzenesulfonic acid)(pSSS). A volume of 10 mL acetone was added to the volume of initial solution and allowed to become transparent before adding and dissolving in the solution a quantity of 0.2 g of the photoinitiator benzophenone (BP) to provide a hydrophilicitizing mixture. The surface of a microporous sheet of poly(ethylene)(TARGRAY™ wet process polyethylene separators, item no. SW320H (Targray, Kirkland QC, Canada)) dimensioned (13.5 cm×18.5 cm) to fit the filter assembly (Sterlitech Corp.) was contacted with the hydrophilicitizing mixture and irradiated with ultraviolet (UV) light (250 nm) for a period of time of 2 minutes. The irradiated contacted sheets were then washed with cold tap water before being placed in a water bath maintained at a temperature of 45 to 50° C. for a time of about 5 minutes. The washed sheets were then air dried before testing or use in the preparation of a composite membrane.

Example 4

The method of preparation described in Example 3 was repeated with the volume of initial solution containing 1.7 g of poly(4-ethenylbenzenesulfonic acid). This quantity of the polymer was close to the maximum that could be dissolved in the solvent system used.

Example 5

A one step method of preparation including the monomer 4-ethenylbenzenesulfonic acid was evaluated.

A volume of 3 mL of the working solution obtained according to Example 1 was mixed with a volume of 8 mL of distilled water and a quantity of 0.6 g of the monomer 4-ethenylbenzenesulfonic acid in a vial to provide a volume of initial solution containing 0.6 g of poly(4-ethenylbenzenesulfonic acid). A volume of 10 mL acetone was added to the volume of this initial solution and allowed to become transparent before adding a quantity of 0.4 g of the photoinitiator benzophenone to provide a hydrophilicitizing mixture.

The surface of a microporous sheet of poly(ethylene) (TARGRAY™ wet process polyethylene separators, item no. SW320H (Targray, Kirkland QC, Canada)) dimensioned (13.5 cm×18.5 cm) to fit the filter assembly (Sterlitech Corp.) was contacted with the hydrophilicitizing mixture and irradiated with UV light (250 nm) for a period of time of 2 minutes before being washed with cold tap water and placed in a water bath maintained at a temperature of 45 to 50° C. for about 5 minutes and then air dried.

Example 6

A two-step method of preparation using only the monomer 4-ethenylbenzenesulfonic acid in the first of the two steps was evaluated.

In the first step a volume of 10 mL of distilled water followed by a volume of 10 mL of acetone was added to a foil wrapped vial containing a quantity of 2.4 g of the monomer and a quantity of 0.4 g of the photoinitiator benzophenone and the mixture shaken until all solids had dissolved. The surface of a microporous sheet of poly (ethylene)(TARGRAY™ wet process polyethylene separators, item no. SW320H (Targray, Kirkland QC, Canada)) dimensioned (13.5 cm×18.5 cm) to fit the filter assembly of a test rig (Sterlitech Corp.) was contacted with the mixture and irradiated with ultraviolet (UV) light (250 nm) before washing with cold tap water and placing in a water bath maintained at a temperature of 45 to 50° C. for a time of 5 minutes before being air dried.

In the second step a volume of 6 mL of the working solution obtained according to Example 1 was mixed with a volume of 5 mL of distilled water in a vial to provide a volume of initial solution containing 1.2 g of poly(4-ethenylbenzenesulfonic acid). A volume of 10 mL acetone was added to the volume of initial solution and allowed to become transparent before adding and dissolving in the solution a quantity of 0.2 of the photoinitiator benzophenone to provide a hydrophilicitizing mixture. The surface of the air dried sheet obtained according to the first step was contacted with the hydrophilicitizing mixture and irradiated with UV light (250 nm) for a period of time of 2 minutes before washing with cold tap water and placing in a water bath maintained at a temperature of 45 to 50° C. for a period of time of about 5 minutes and then air dried.

Observations

Grafting of the preformed poly(4-ethenylbenzenesulfonic acid) onto the microporous sheet of poly(ethylene) according to the methods of preparation described in Example 3, Example 4, Example 5 and Example 6 was confirmed by washing in acetone (solvent for the photoinitiator benzophenone) and water (solvent for poly(4-ethenylbenzenesulfonic acid)). Four washing protocols (1, 2, 3 and 4) were adopted and the FTIR spectra recorded for samples of hydrophilicitized sheets of microporous poly(ethylene) prepared according to the method described in Example 3 following application of these washing protocols are presented in FIG. 3.

Preparation of Hydrophilicitized Microporous Sheets of poly(ethylene) Using Poloxamer (High Hydrophilicity)

Example 7

A volume of 10 mL of a solution in water of 10% (w/v) triblock copolymer (PLURONIC™ P-123; lot #MKCC2305, Sigma-Aldrich) was mixed with an equal volume of deionised water. A quantity of 0.2 g of the photoinitiator benzophenone (diphenylmethanone; $Ph_2O$) was dissolved in a separate volume of 10 mL of ethanol before being added to the diluted solution of the triblock copolymer. This working solution was stored in the dark until use.

Samples (13.5×18.5 cm) were cut from a microporous sheet of poly(ethylene) (TARGRAY™ wet process polyethylene separators, item no. SW320H (Targray, Kirkland QC, Canada)) and each sample coated with a volume of the working solution using the rollers from a developmental continuous production line. The coated samples were then irradiated with ultraviolet (UV) light (250 nm) for a period of time of two minutes before rinsing with water and air-drying at room temperature.

The three replicate samples prepared according to this method were designated 040918Wiv, 040918Wv and 040918Vi. A small piece of the sample designated 040918Wiv was excised from the edge of the sample and submitted to scanning electronic microscopy (SEM).

Each of the samples was readily wetted with water.

Composite Membranes

Preparation of Composite Membrane Using Microporous Sheet of poly(ethylene) Grafted with Poly(4-ethenyl benzene sulfonic acid (Low Hydrophilicity)

Example 8

A series of preliminary experiments were performed to evaluate methods of preparing a film of cross-linked poly (ethenol) (xPVA) on a surface. A solution of the radical initiator sodium persulfate (SPS) was prepared by adding a quantity of 0.2 g of SPS to a volume consisting of 10 mL deionised water and 10 mL acetone. The solution of radical initiator was applied onto the surface of each of three glass plates (Plate 1, Plate 2 and Plate 3). Plate 2 and Plate 3 were transferred to an oven and dried at a temperature of 60° C. until all solvent had evaporated to leave a thin layer of the initiator deposited on the surface. Solutions of poly(ethenol) (PVA) were prepared at a concentration of 1% (w/v) in either dimethyl sulfoxide (DMSO) or deionised water. The solution of poly(ethenol) (PVA) in DMSO was sprayed onto the wet surface of Plate 1 and the plate then transferred to an oven and dried at a temperature of 60° C. The solution of poly(ethenol)(PVA) in DMSO was also sprayed onto the dry surface of Plate 2 and the plate then transferred to an oven and dried at a temperature of 60° C. The solution of poly(ethenol) in deionised water was sprayed onto the dry surface of Plate 3 and the plate then transferred to an oven and dried at a temperature of 60° C. The desired film of cross-linked poly(ethenol) was not formed on Plate 1. The failure attributed to the presence of acetone causing the polymer to crash out of solution. The film formed on Plate 2 was too frangible to be useful as a rejection layer of an asymmetric composite membrane. A clear, peelable film formed on the surface of Plate 3. The film was not brittle and this method of preparation was adopted for use in the preparation of the asymmetric composite membrane.

Example 9

A series of preliminary experiments were performed to evaluate methods of preparing a film of partially cross-linked poly(ethenol) (xPVA) and thereby control the properties of the rejection layer of the composite membrane. Volumes of 10 mL of a 1% (w/v) solution of poly(ethenol) (PVA) in deionised water containing a quantity of 0.1 g of SPS were dispensed into each four vials (Vial 1, Vial 2, Vial 3 and Vial 4). The solution in each vial was heated to a temperature of 75° C. and maintained at this temperature with stirring until the following observations were made (and the vials then cooled):

A yellow solid crashed out of solution (Vial 1; 3 to 4 minutes)

A cloudy white solution with some precipitation formed (Vial 2, around 3 minutes)

A cloudy white solution formed (Vial 3; 1.5 to 2 minutes)

A cloudy solution started to form (Vial 4; 10 to 20 seconds)

Figure 3:
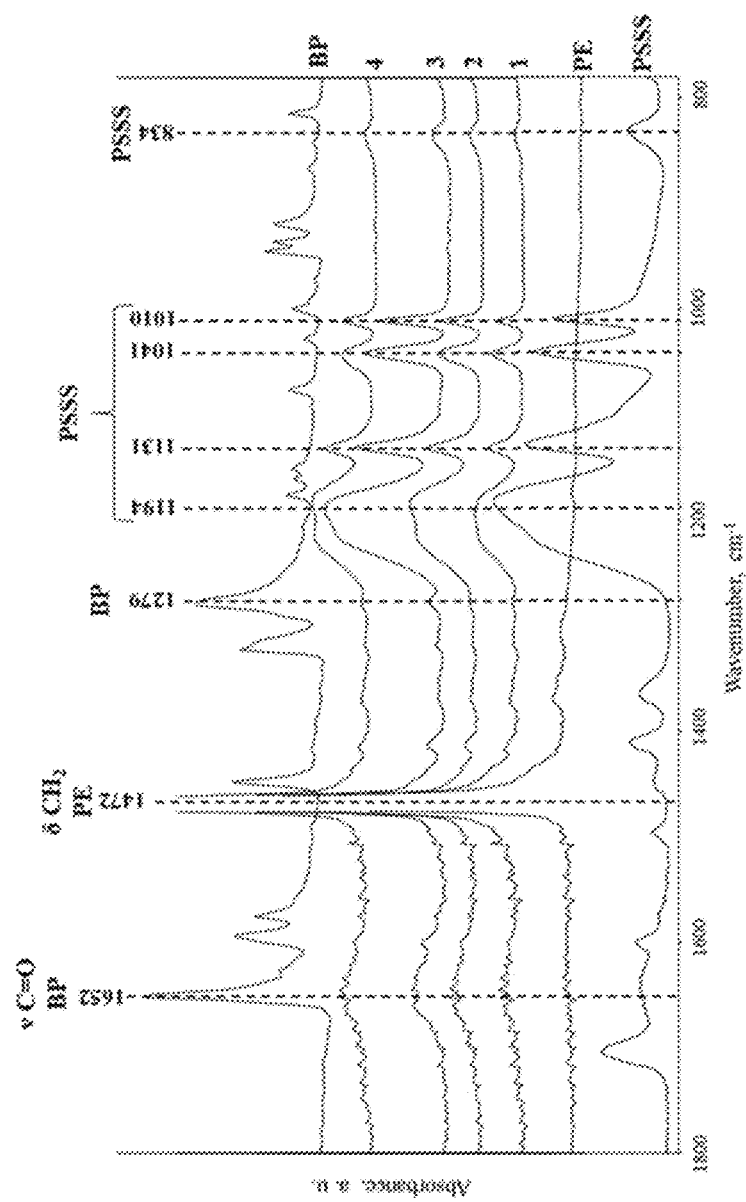
FIG. 3. FTIR spectra recorded for poly(4-ethenylbenzenesulfonic acid)(PSSS), the photoinitiator benzophenone (BP), no washing protocol (1), washed with water at a temperature of 45 to 50° C. before drying (2), washed with acetone (3) and washed with water at a temperature of 45 to 50° C., dried and then washed with acetone (4).

The observations are also presented in FIG. 3. The method of preparing partially cross-linked poly(ethenol) according to that formed in Vial 3 was adapted for use in the preparation of the membrane.

Example 10

A volume of 20 mL of the solution of the radical initiator sodium persulfate (SPS) was prepared according to Example 8. A volume of the solution of partially cross-linked poly (ethenol) (xPVA) was prepared according to Example 9 (Vial 3).

The solution of the radical initiator was applied to one surface of a hydrophilicitized microporous sheet of poly (ethylene) prepared according to Example 3. The sheet was then placed on a glass plate and transferred to an oven and dried at a temperature of 60° C. The solution of partially cross-linked poly(ethenol) was applied to the same surface of the dried sheet and the sheet then returned to the oven and dried at 60° C. The dried membrane was then washed with cool water and air dried before evaluation for flux, total solids and salts rejection with different feed streams (water and milk).

Example 11

To facilitate use in the continuous production of membranes on a developmental continuous production line a more viscous solution of partially cross-linked poly(ethenol) (xPVA) was required. Solutions having a final concentration of 5, 8 and 10% (w/v) were therefore prepared and evaluated.

A volume of 11.5 mL of a solution in distilled water of 0.1 g sodium persulfate (SPS) was mixed with a volume of 8.5 mL of a solution in water of 12% (w/v) poly(ethenol) to provide a total volume of 20 mL at a final concentration of 5% (w/v).

A volume of 6.5 mL of a solution in distilled water of 0.2 g sodium persulfate (SPS) was mixed with a volume of 13.5 mL of a solution in water of 12% (w/v) poly(ethenol) to provide a total volume of 20 mL at a final concentration of 8% (w/v).

A volume of 3.5 mL of a solution in distilled water of 0.2 g sodium persulfate (SPS) was mixed with a volume of 16.5 mL of a solution in water of 12% (w/v) poly(ethenol) to provide a total volume of 20 mL at a final concentration of 10% (w/v).

A portion of each of the volumes at a final concentration of 5, 8 and 10% (w/v) poly(ethenol) (PVA) was transferred to a vial and each stirred with heating to 75° C. until the solution turned a pale yellow (cf. Vial 3 of Example 9). These vials containing partially cross-linked poly(ethenol) (xPVA) were then cooled to room temperature.

The volume containing 10% (w/v) partially cross-linked poly(ethenol)(xPVA) was applied to one surface of a hydrophilicitized microporous sheet of poly(ethylene) prepared according to Example 3 using the rollers of the developmental continuous production line before being placed on a glass plate and transferred to an oven and dried at a temperature of 60° C. The composite membrane was then washed with cool water and air dried before evaluation for flux and protein rejection with different feed streams (water and milk) (Table 4).

Preparation of Composite Membrane Using Microporous Sheet of poly(ethylene) Grafted with a Poloxamer (High Hydrophilicity)

Example 12

A volume of a solution in water of 1% (w/w) of the radical initiator sodium persulfate (SPS) and 8% (w/w) partially cross-linked poly(ethenol) (xPVA) prepared according to Example 11 was applied to one surface of a hydrophilicitized microporous sheet of poly(ethylene) prepared according to Example 7. The sheet was then irradiated at a wavelength of 250 nm for a period of time of two minutes before being placed on a glass plate and transferred to an oven and dried at a temperature of 60° C.

Example 13

A volume of a solution in water of 1% (w/w) of the radical initiator sodium persulfate (SPS) and 5% (w/w) poly(ethenol) (PVA) prepared according to Example 11 was applied directly, i.e. without crosslinking, to one surface of a hydrophilicitized microporous sheet of poly(ethylene) prepared according to Example 7. The sheet was then irradiated at a wavelength of 250 nm for a period of time of two minutes before being placed on a glass plate and transferred to an oven and dried at a temperature of 60° C. The composite membrane was then washed with cool water and air dried before evaluation for flux and protein rejection with different feed streams (water and milk) (Table 4).

Example 14

A volume of a solution in water of 1% (w/w) of the radical initiator sodium persulfate (SPS) and 8% (w/w) poly(ethenol) (PVA) prepared according to Example 11 was applied directly, i.e. without crosslinking, to one surface of a hydrophilicitized microporous sheet of poly(ethylene) prepared according to Example 7. The sheet was then irradiated at a wavelength of 250 nm for a period of time of two minutes before being placed on a glass plate and transferred to an oven and dried at a temperature of 60° C. The composite membrane was then washed with cool water and air dried before evaluation for flux and protein rejection with different feed streams (water and milk) (Table 4).

Evaluation of Samples of Composite Membrane

Replicate samples (240818Si, 240818Sii, 240818Siii, 030918Si, 030918Sii, 030918Siii) of membrane prepared according to Example 10 were evaluated. The results of this evaluation are summarised in Table 1. Following an initial wetting with 20% (v/v) isopropanol in water, fluxes in the range 7.8 to 10.9 litres per square meter per hour (LMH) were obtainable for a feed stream of water at a pressure of 10 bar. Similar, if not slightly greater fluxes were obtained for a solution of salts with salt rejection in excess of 20%. For a feed stream of whole milk, fluxes were reduced but provided in excess of 50% total solids rejection and well in excess of greater than 99% protein rejection.

TABLE 1

Evaluation of samples of asymmetric composite membrane prepared according to Example 10. The sample (240818Siii) demonstrating the highest salt rejection was also evaluated along with two other samples (030918Sii and 030918Siii) for total solids and protein rejection with milk as a feed stream.

| Sample | Initial flux (LMH) | Salt flux (LMH) | Salt rejection (%) | Milk flux (LMH) | Total solids rejection (%) | Protein rejection (%) |
|---|---|---|---|---|---|---|
| 240818Si | 10.9 at 10 bar | 11.7 at 10 bar | 20.3 | — | — | |
| 240818Sii | 7.8 at 10 bar | 10.7 at 10 bar | 21.3 | — | — | |
| 240818Siii | 8.9 at 10 bar | 10.3 at 10 bar | 28.4 | 4.5 at 10 bar | 63.0 | 99.95 |
| 030918Si | 2.1 at 5 bar | — | — | 1.3 at 10 bar | — | 99.83 |
| 030918Sii | — | — | — | 0.7 at 5 bar | 62.4 | 99.99 |
| 030918Siii | — | — | — | 0.6 at 5 bar | 55.7 | 100.00 |

TABLE 2

Flux, total solids and protein rejection of a sample of an asymmetric composite membrane (030918Sii) prepared according to Example 10 during repeated clean-in-place (CIP) protocols.

| Number of CIPs | Milk flux (LMH) | Total solids rejection (%) | Protein rejection (%) |
|---|---|---|---|
| 0 | 0.7 | 62.4 | 99.99 |
| 1 | 2.3 | 55.9 | 99.94 |
| 2 | 2.0 | — | 99.94 |
| 3 | 4.7 | 50.7 | 99.93 |
| 4 | 5.0 | 46.3 | 99.88 |
| 5 | 5.7 | 42.0 | 99.84 |
| 10 | 5.7 | 49.0 | 99.87 |

Figure 4:
FIG. 4. Photograph of vials containing partially crosslinked poly(ethenol) (xPVA) prepared according the Example 8. From left to right: Vial 1, Vial 2, Vial 3 and Vial 4.
Figure 5:
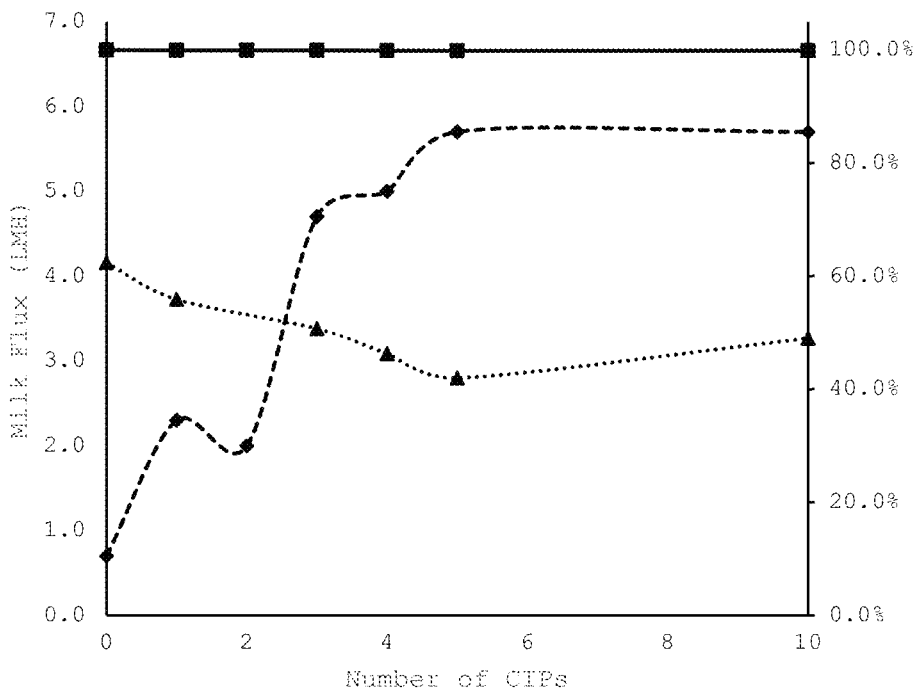
FIG. 5. Flux (LMH) (♦, broken line), total solids (%) (▲, dotted line) and protein rejection (%) (■, solid line) of a sample of an composite membrane (030918Sii) prepared according to Example 10 during repeated clean-in-place (C-i-P) protocols.
Figure 6:
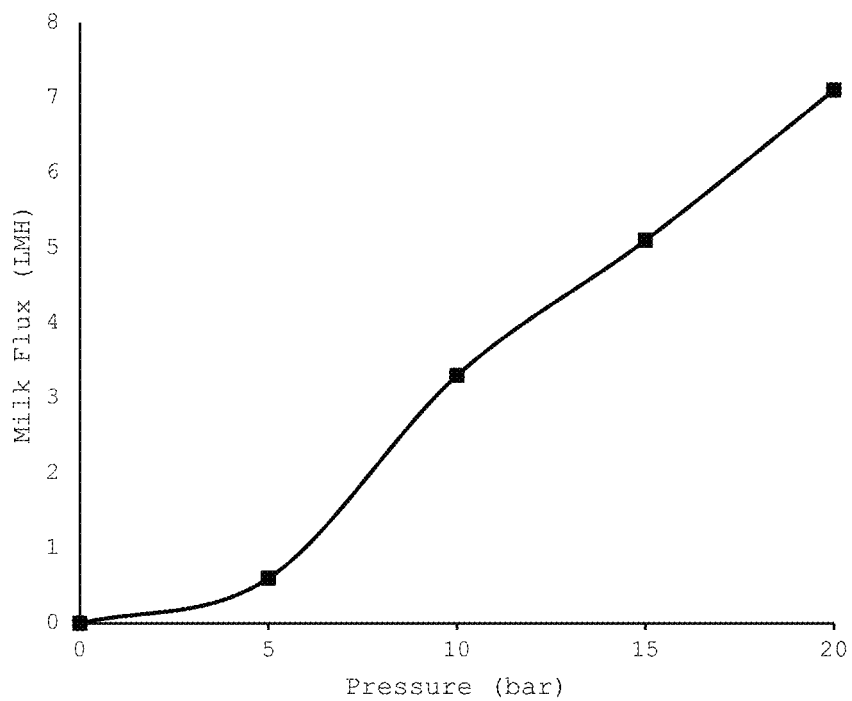
FIG. 6. Pressure series testing (0 to 20 bar) of a sample (030918Siii) of a composite membrane prepared according to Example 10. Flux and protein rejection with milk as the feed stream were measured.
Figure 7:
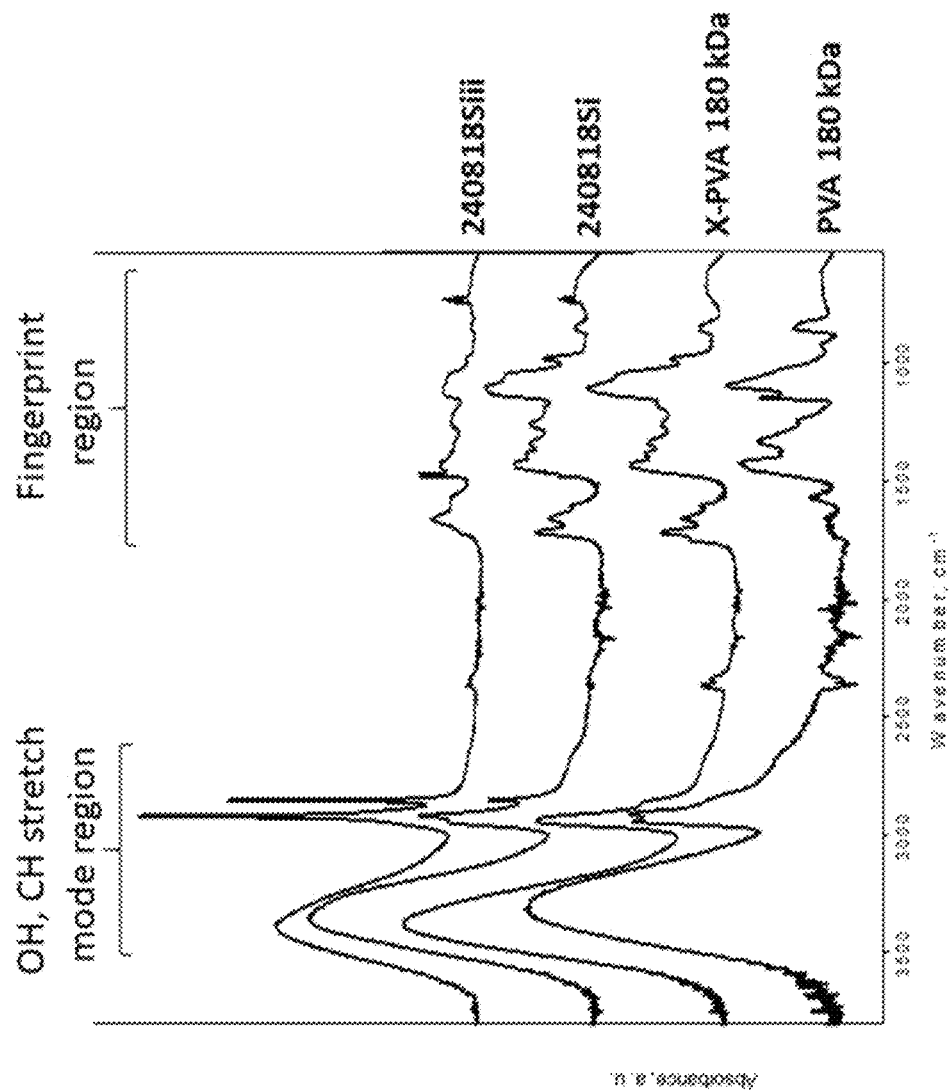
FIG. 7. Comparison of the FTIR spectra (full range) recorded for samples (240818Si and 240818Sii) of a composite membrane prepared according to Example 10 and the poly(ethenol) (PVA) and cross-linked poly(ethenol) (xPVA) used in their preparation.
Figure 8:
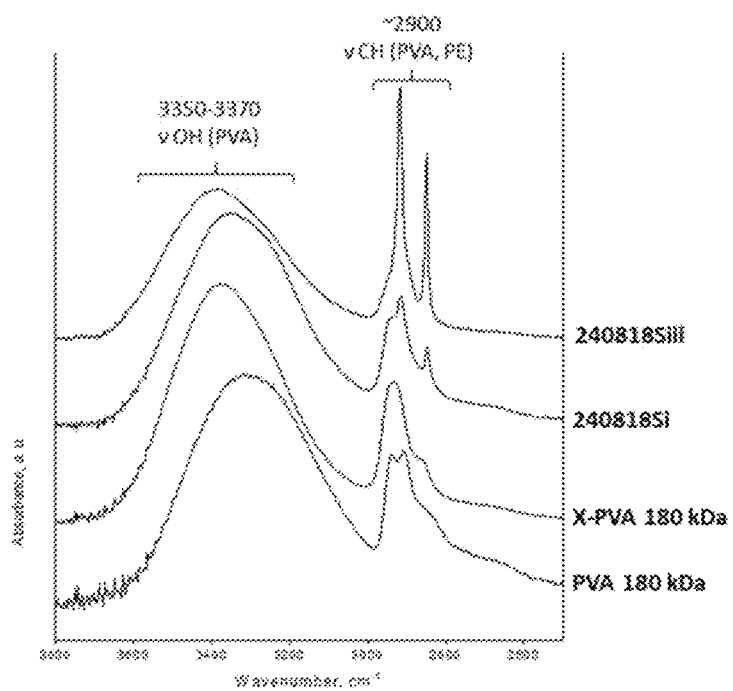
FIG. 8. Comparison of the FTIR spectra (stretch mode region) recorded for samples (240818Si and 240818Sii) of a composite membrane prepared according to Example 10 and the poly(ethenol) (PVA) and cross-linked poly(ethenol) (xPVA) used in their preparation.
Figure 9:
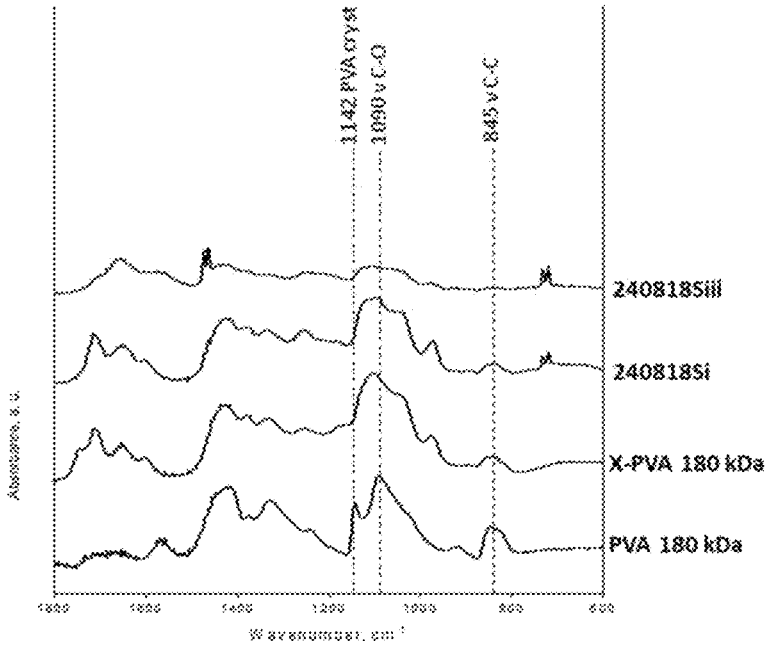
FIG. 9. Comparison of the FTIR spectra (fingerprint region) recorded for samples (240818Si and 240818Sii) of a composite membrane prepared according to Example 10 and the poly(ethenol) (PVA) and cross-linked poly(ethenol) (xPVA) used in their preparation.
Figure 10:
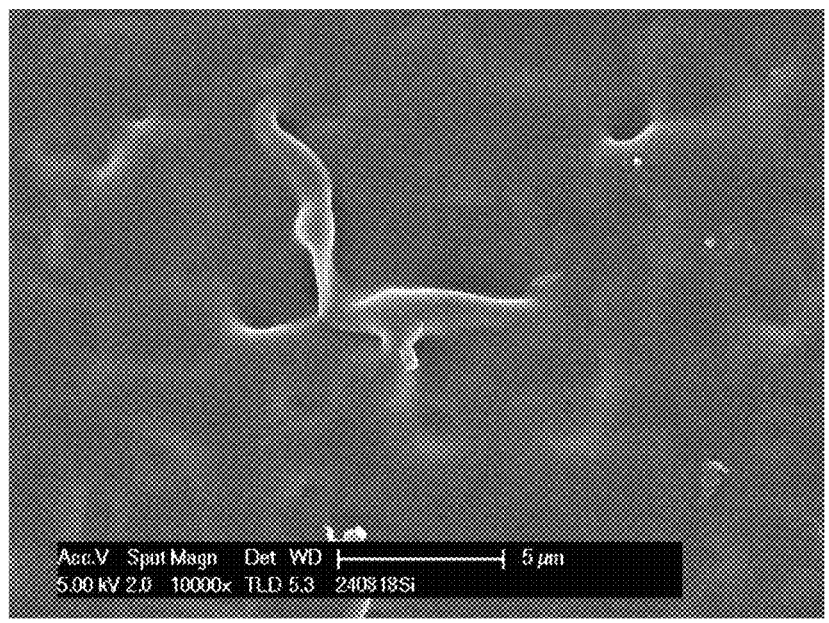
FIG. 10. Scanning electron micrographs of the surface of samples of composite membrane prepared according to Example 10 before (A) and after (B) being subjected to repeated clean-in-place (CIP) protocols.
Figure 10:

One of the samples (030918Sii) was further evaluated for its tolerance to clean-in-place (CIP) protocols. One of the samples (030918Siii) was also further evaluated in a pressure series test to see how the flux and protein rejection were affected. The results of these further evaluations are summarised in Tables 2 and 3 and FIGS. 4 and 5.

TABLE 3

Pressure series testing (0 to 20 bar) of a sample (030918Siii) of an asymmetric composite membrane prepared according to Example 10. Flux and protein rejection with milk as the feed stream were measured.

| Pressure | Milk flux (LMH) | Protein rejection (%) |
|---|---|---|
| 0 | — | 99.99 |
| 5 | 0.6 | 99.94 |
| 10 | 3.3 | 99.94 |
| 15 | 5.1 | 99.93 |
| 20 | 7.1 | 99.88 |

Samples of composite membrane prepared according to Example 11, Example 13 and Example 14 were evaluated. A protein rejection above 99.9% was observed for all samples. Increases in the concentration of poly(ethenol) (PVA) used to prepare the rejection layer were observed to reduce the flux for both water and milk as the feed stream. This is attributed to the increasing concentrations increasing the viscosity of the solution applied to the hydrophilicitized microporous sheet of polyolefin and reduced ease of application on the developmental continuous production line. For example, the viscosity of solutions prepared at a concentration of 10% (w/v) or more of poly(ethenol) is too high, limiting the facility with which a thin, consistent coating can be achieved. By contrast, the viscosity of solutions prepared at a concentration of 5% (w/v) or less of poly(ethenol) is too low, again limiting the facility with which a thin, consistent coating can be achieved. A concentration around 8% (w/v) appears to be optimal as this scale of continuous production.

TABLE 4

Evaluation of samples of membrane prepared according to Example 11, Example 13 and Example 14. (*indicates sample of membrane evaluated after clean-in-place protocol and drying).

| Membrane | Average water flux at 5 bar (LMH) | Average milk flux at 5 bar (LMH) | Protein rejection |
|---|---|---|---|
| 8% xPVA adhered to poloxamer-µPE Example 14*) | 11.7 | 7.8 | 99.97% |
| 10% xPVA adhered to pSSS-µPE (Example 11) | 3.8 | 1.8 | 99.96% |
| 5% xPVA adhered to poloxamer-µPE Example 13) | 32.2 | 11.6 | 99.92% |
| 8% xPVA adhered to poloxamer-µPE (Example 14) | 7.0 | 3.8 | 99.91% |
| poloxamer-µPE (Example 7) | 826 | 20.6 | 99.56% |

Although the invention has been described with reference to embodiments or examples it should be appreciated that variations and modifications may be made to these embodiments or examples without departing from the scope of the invention. Where known equivalents exist to specific elements, features or integers, such equivalents are incorporated as if specifically referred to in this specification. In particular, variations and modifications to the embodiments or examples that include elements, features or integers disclosed in and selected from the referenced publications are within the scope of the invention unless specifically disclaimed. The advantages provided by the invention and discussed in the description may be provided in the alternative or in combination in these different embodiments of the invention.

INDUSTRIAL APPLICABILITY

A durable composite membrane with high levels of protein rejection whilst maintaining a high flux with feed streams such as whole milk is provided.

INCORPORATION BY REFERENCE

Where the claims, description or drawings of this specification are missing in their entirety or part, the corresponding portion of the specification accompanying the most recently filed application from which priority is claimed is to be incorporated by reference so as to complete this specification in accordance with Rules 4.18, 20.5 and 20.6 of the PCT Regulations (as in force from 1 Jul. 2015 or subsequently amended).

For the purposes of 37 C.F.R. 1.57 of the United States Code of Federal Regulations the disclosures of the following publications (as more specifically identified under the heading 'Referenced Publications') are incorporated by reference: Jones et al (2008) and Schmolka (1973).

REFERENCED PUBLICATIONS

Allmer et al (1988) *Surface modification of polymers. I. Vapor-phase photografting with acrylic acid* Journal of Polymer Science, Part A: Polymer Chemistry, 26(8), 2099-111.

Allmer et al (1989) *Surface modification of polymers. II. Grafting with glycidyl acrylates and the reactions of the grafted surfaces with amines* Journal of Polymer Science: Part A: Polymer Chemistry, 27, 1641-1652.

Ang et al (1980) *Photosensitized grafting of styrene, 4-vinylpyridine and methyl methacrylate to polypropylene* Journal of Polymer Science: Polymer Letters Edition, 18, 471-475.

Anon (2014) *DOW FILMTEC™ Membranes—Cleaning procedures for DOW FILMTEC FT30 elements* Tech Fact (Form No. 609-23010-0211).

Bai et al (2011) *Surface UV photografting of acrylic acid onto LDPE powder and its adhesion* Shenyang Huagong Daxue Xuebao 25(2), 121-125.

Bolto et al (2009) *Crosslinked poly(vinyl alcohol) membranes* Progress in Polymer Science, 34, 969-981.

Callis et al (2008) Humidifier membrane International application no. PCT/EP2007/008710 [publ. no. WO 2008/043507 A1].

Carter et al (2018) *Controlling external versus internal pore modification of ultrafiltration membranes using surface-initiated AGET-ATRP* Journal of Membrane Science, 554, 109-116.

Cheng et al (2017) Method for preparing mesoporous composite film Chinese patent application no. 201611226194 [Publ. no. CN 106731886 A].

Choi (2002) Graft polymerisation, separators, and batteries including the separators U.S. Pat. No. 6,384,100.

Choi (2004) Battery separator U.S. Pat. No. 6,680,144.

Choi (2005) Graft polymerisation, separators, and batteries including the separators U.S. Pat. No. 6,955,865.

Craft et al (2017) Asymmetric composite membrane and a method of preparation thereof International application no. PCT/IB2016/055899 [publ. no. WO 2017/056074 A1].

Edge et al (1993) *Surface modification of polyethylene by photochemical grafting with 2-hydroxyethylmethacrylate* Journal of Applied Polymer Science, 47, 1075-1082.

El Kholdi et al (2004) *Modification of adhesive properties of a polyethylene film by photografting* Journal of Applied Polymer Science 92(5), 2803-2811.

Exley (2016) Asymmetric composite membranes and modified substrates used in their preparation International application no. PCT/IB2015/060001 [Publ. no. WO 2016/103239 A1].

Gao et al (2013) Radiation cross-linked lithium-ion battery separator with high rupture temperature and high tensile strength and manufacture method Chinese patent application no. 2013-10196439 (publ. no. CN 103421208).

Guo et al (2015) Coated microporous materials having filtration and adsorption properties and their use in fluid purification processes International application no. PCT/US2014/061326 [Publ. no. WO 2015/073161 A1].

Jaber and Gjoka (2016) Grafted ultra high molecular weight polyethylene microporous membranes international application no. PCT/US2015/061591 [publ. no. WO 2016/081729 A1].

Jones et al (2008) *Compendium of polymer terminology and nomenclature IUPAC Recommendations*, RSC Publishing.

Kubota and Hata (1990a) *Distribution of methacrylic acid-grafted chains introduced into polyethylene film by photografting* Journal of Applied Polymer Science, 41, 689-695.

Kubota and Hata (1990b) *Benzil-sensitized photografting of methacrylic acid on low-density polyethylene film* Journal of Applied Polymer Science, 40, 1071-1075.

Linder et al (1988) Semipermeable composite membranes, their manufacture and use U.S. Pat. No. 4,753,725.

Liu et al (2014) With multi-scale gradient microstructure surface preparation method of a microporous membrane Chinese patent application no. 201310479920 [Publ. no. CN 103611437 A].

Ogiwara et al (1981) Photosensitized grafting on polyolefin films in vapor and liquid phases Journal of Polymer Science: Polymer Letters Edition, 19, 457-462.

Schmolka (1973) Polyoxyethylene-polyoxypropylene aqueous gels U.S. Pat. No. 3,740,421.

Shentu et al (2002) *Factors affecting photo-grafting on low density polyethylene* Hecheng Suzhi Ji Suliao 19(3), 5-8.

Singleton et al (1993) Polymeric sheet International application No. PCT/GB92/01245 (publ. no. WO 93/01622).

Tazuke and Kimura (1978) *Surface photografting. I. Graft polymerization of hydrophilic monomers onto various polymer films* Journal of Polymer Science: Polymer Letters Edition, 16, 497-500.

Wang et al (2006) *Pluronic polymers and polyethersulfone blend membranes with improved fouling-resistant ability and ultrafiltration performance* Journal of Membrane Science, 283, 440-447.

Xu and Yang (2000) *Study on the mechanism of LDPE-AA vapor-phase photografting system* Gaofenzi Xuebao (2000), 5, 594-598.

Yang and Ranby (1996a) *The role of far UV radiation in the photografting process* Polymer Bulletin (Berlin), 37(1), 89-96.

Yang and Ranby (1996b) *Bulk surface photografting process and its applications. II. Principal factors affecting surface photografting* Journal of Applied Polymer Science, 63(3), 545-555.

Yang et al (2014) *Preparation and application of PVDF-HFP composite polymer electrolytes in $LiNi_{0.5}Co_{0.2}Co_{0.3}O2$ lithium-polymer batteries* Electrochimica Acta 134, 258-265.

Yao and Ranby (1990a) *Surface modification by continuous graft copolymerization. I. Photoinitiated graft copolymerization onto polyethylene tape film surface* Journal of Applied Polymer Science, 40, 1647-1661.

Yao and Ranby (1990b) *Surface modification by continuous graft copolymerization. III. Photoinitiated graft copolymerization onto poly(ethylene terephthalate) fiber surface* Journal of Applied Polymer Science, 41, 1459-1467.

Yao and Ranby (1990c) *Surface modification by continuous graft copolymerization. IV. Photoinitiated graft copolymerization onto polypropylene fiber surface* Journal of Applied Polymer Science, 41, 1469-1478.

Zhang and Ranby (1991) *Surface modification by continuous graft copolymerisation. II. Photoinitiated graft copolymerization onto polypropylene film surface* Journal of Applied Polymer Science, 43, 621-636.

The invention claimed is:

1. A method of preparing an asymmetric composite membrane comprising:
   a) Wetting one side of a hydrophilicitized microporous sheet of polyolefin with a solution in an aqueous solvent comprising poly(ethenol) and a persulfate;
   b) Irradiating the wetted sheet to graft the poly(ethenol) to the sheet; and then
   c) Washing and drying the sheet to provide the asymmetric composite membrane, where the microporous sheet has been hydrophilicitized by grafting of the polyolefin with a preformed polymer.

2. The method of claim 1 where the preformed polymer is poly(4-ethenyl benzene sulfonic acid) or a poloxamer of the structure:

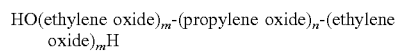

where m is in the range 15 to 25 and n is in the range 50 to 90.

3. The method of claim 2 where the aqueous solvent is water.

4. The method of claim 3 where the persulfate is sodium persulfate (SPS).

5. The method of claim 4 where the polyolefin is poly(ethylene).

* * * * *